US008885871B2

(12) United States Patent
Varadharajan et al.

(10) Patent No.: US 8,885,871 B2
(45) Date of Patent: Nov. 11, 2014

(54) METHOD AND SYSTEM FOR PERFORMING TRANSCODING RESISTANT WATERMARKING

(75) Inventors: Vijayaraghavan Varadharajan, Salem (IN); Sagar Joglekar, Pune (IN); Rajarathnam Nallusamy, Trichy Dist. (IN); Sanjoy Paul, Bangalore (IN)

(73) Assignee: Infosys Limited (IN)

( * ) Notice: Subject to any disclaimer, the term of this patent is extended or adjusted under 35 U.S.C. 154(b) by 119 days.

(21) Appl. No.: 13/325,168

(22) Filed: Dec. 14, 2011

(65) Prior Publication Data

US 2013/0156255 A1 Jun. 20, 2013

(51) Int. Cl.
*G06K 9/00* (2006.01)

(52) U.S. Cl.
USPC .......................................... 382/100

(58) Field of Classification Search
USPC ................. 382/100, 276, 282, 306; 713/176; 380/201–203, 238, 253; 358/3.28; 348/211.5, 460
See application file for complete search history.

(56) References Cited

U.S. PATENT DOCUMENTS

| 6,064,764 | A | 5/2000 | Bhaskaran et al. | |
|---|---|---|---|---|
| 6,512,837 | B1* | 1/2003 | Ahmed | 382/100 |
| 6,571,144 | B1* | 5/2003 | Moses et al. | 700/94 |
| 7,444,418 | B2* | 10/2008 | Chou et al. | 709/231 |
| 7,461,255 | B2* | 12/2008 | Iwamura | 713/176 |
| 7,937,588 | B2* | 5/2011 | Picard et al. | 713/176 |
| 2003/0021439 | A1* | 1/2003 | Lubin et al. | 382/100 |
| 2003/0112997 | A1* | 6/2003 | Ahmed | 382/100 |
| 2005/0154892 | A1* | 7/2005 | Mihcak et al. | 713/176 |
| 2007/0201719 | A1* | 8/2007 | Hashimoto et al. | 382/100 |
| 2008/0159403 | A1* | 7/2008 | Dunning | 375/240.21 |
| 2010/0067736 | A1* | 3/2010 | Kihara | 382/100 |
| 2010/0188709 | A1* | 7/2010 | Simske et al. | 358/3.28 |
| 2010/0202652 | A1* | 8/2010 | Mihcak et al. | 382/100 |
| 2012/0075440 | A1* | 3/2012 | Ahuja et al. | 348/61 |
| 2013/0273968 | A1* | 10/2013 | Rhoads et al. | 455/556.1 |

FOREIGN PATENT DOCUMENTS

EP 0947953 A3 1/2001

OTHER PUBLICATIONS

Vijayaraghavan et al ("Transcoding resistant robust watermarking technique using entropy-based selective spread spectrum", International Journal of Multimedia Intelligence and Security, vol. 1, No. 4, Jan. 2010.*
Aboofazeli et al ("A Wavelet Transform Based Digital Image Watermarking Scheme", Niagara Falls, Mayhai 2004.*

(Continued)

*Primary Examiner* — Shervin Nakhjavan
(74) *Attorney, Agent, or Firm* — Lerner, David, Littenberg, Krumholz & Mentlik, LLP

(57) ABSTRACT

A method for performing transcoding resistant watermarking of digital media content is provided. The method enables obtaining a plurality of spectral frequency bands of the digital media content. The method further enables calculating an entropy value for each of the plurality of spectral frequency bands. The entropy value quantifies information in each of the plurality of spectral frequency bands. The method further enables selecting a spectral frequency band from amongst the plurality of spectral frequency bands based on the calculation. The selected spectral frequency band has the highest entropy. Furthermore, the method enables inserting a watermark in the selected spectral frequency band of the digital media content.

7 Claims, 6 Drawing Sheets

(56) References Cited

OTHER PUBLICATIONS

Kurup et al ("Entropy Based Data Hiding for Document Images", World Academy of Science, Engineering and Technology 11 2005.*

Hsieh et al ("Wavelet-based Color Image Watermarking using Adaptive Entropy Casting", Department of Information Management Aletheia University, Tamsui, Taiwan 251, 2006.*

Cheng et al ("Enhanced Spread Spectrum Watermarking of MPEG-2 AAC Audio", Texas A&M University, 2002).*

Camarena-Ibarrola et al ("Robust Radio Broadcast Monitoring Using a Multi-Band Spectral Entropy Signature", University of Michoacana, 2009).*

Ali et al., "A Semi-Fragile Watermarking Technique for H.264/AVC Using CAVLC", International Journal of Signal and Image Processing, vol. 1, Iss.3, 2010, pp. 151-159.

Sadr et al., "Robustness Enhancement of Content-Based Watermarks Using Entropy Masking Effect", IWDW 2005, LNCS 3710, pp. 444-458, 2005.

Zaboli et al., "Entropy-Based Image Watermarking Using DWT and HVS", SETIT 2005, 3rd International Conference: Sciences of Electronic, Technologies of Information and Telecommunications Mar. 27-31, 2005—Tunisia.

* cited by examiner b) extracted watermark before transcoding d) extracted watermark after insertion a) original watermark c) extracted watermark after transcoding

METHOD AND SYSTEM FOR PERFORMING TRANSCODING RESISTANT WATERMARKING

FIELD OF THE INVENTION

The present invention relates generally to watermarking of digital media content and more specifically to a method and system for performing transcoding resistant watermarking of media content.

BACKGROUND OF THE INVENTION

With the advent of converged networks, there is a growing demand for customers to access media i.e. images, audio, video via different electronic devices such as Personal Computer (PC), laptop, mobile device, Television (TV) Internet Protocol Television (IPTV) etc. For example, today customers have a requirement to access media applications such as video on demand application via PC in the office, IPTV at home and mobile device during transit. The different devices may support different formats for facilitating rendering of the received media. Accordingly, prior to rendering the media on the different devices i.e. PC, IPTV and mobile device, the media requires transformation from one encoding format to other encoding formats which the different devices support. This technique of transforming media data from one encoding format to another encoding format is referred to as transcoding.

Convergence of networks and increase in access to digital media using different devices has in turn facilitated unauthorized copying and distribution of the digital media. Currently, digital watermarking is adopted for protecting the digital media content by inserting copyright information in the media content. Watermark is a visible or an invisible digital pattern which is inserted into digital media and the watermark facilitates identifying copyright owner of the digital media. For example, in case of video content, watermark pattern is embedded into original video content in spatial domain which includes embedding identical or non-identical watermarks in frames of the video content. Watermark pattern may also be embedded into original video content in frequency domain i.e. in Discrete Wavelet Transform (DWT) bands, using techniques of multi-resolution signal decomposing, using Discrete Fourier Transform (DFT), using Discrete Cosine Transform (DCT), and using DCT based perceptual watermarking methods.

However, the watermark pattern inserted in the media content may get distorted when the media content is transcoded according to the device on which media is to be rendered. This is so, as during transcoding process there are various stages such as scaling, compression, translation and interleaving of media content takes place which may unintentially distort or remove the inserted watermark. This in turn may cause difficulty in proving the copyright ownership. To overcome this drawback, conventionally, watermark is inserted into the digital media after transcoding is performed for each device on which media is to be rendered. That is, the same media content is watermarked separately after transcoding is performed for each of the devices. This results in redundancy and increase in processing overhead as well as computational complexity and cost. There is, therefore, a need for a system and method for performing watermarking in a manner that minimizes the effects of transcoding on the watermark pattern.

In light of the abovementioned drawbacks, there is a need of a method and system which facilitates inserting watermark in the original media content before transcoding such that the watermark is not distorted when the media content is transcoded for different devices. Further, there is a need for a system and method that facilitates enhancing data security across various formats of media content. In addition, there is a need for a system and method that facilitates adaptive content providers to provide a robust watermarking technique that facilitates secure media delivery with lower computational cost and complexity.

SUMMARY OF THE INVENTION

A method for performing transcoding resistant watermarking of digital media content is provided. In various embodiments of the present invention, the method comprises obtaining a plurality of spectral frequency bands of the digital media content. The method further comprises calculating an entropy value for each of the plurality of spectral frequency bands. The entropy value quantifies information in each of the plurality of spectral frequency bands. The method further comprises selecting a spectral frequency band from amongst the plurality of spectral frequency bands based on the calculation. The selected spectral frequency band has the highest entropy. Furthermore, the method comprises inserting a watermark in the selected spectral frequency band of the digital media content.

In an embodiment of the present invention, obtaining a plurality of spectral frequency bands of the digital media content comprises passing the digital media content through a plurality of band pass filters of specific predetermined ranges to obtain corresponding spectral frequency bands.

In another embodiment of the present invention, calculating an entropy value corresponding to each of the plurality of spectral frequency bands comprises calculating the entropy value based on probability distribution of pixels in each of the spectral frequency bands.

A method for performing transcoding resistant watermarking of digital media content is provided. In various embodiments of the present invention, the method comprises obtaining a plurality of spectral frequency bands of the digital media content. The method further comprises calculating a first metric for each of the plurality of spectral frequency bands. The first metric quantifies information in each of the plurality of spectral frequency bands. The method further comprises determining a second metric in the digital media content. The second metric represents high feature density regions in the media content. Furthermore, the method comprises identifying high information regions in the digital media content using at least one of: the first metric and the second metric. The method further comprises inserting a watermark in the identified high information regions in the digital media content.

In an embodiment of the present invention, calculating a first metric for each of the plurality of spectral frequency bands comprises calculating an entropy value corresponding to each of the plurality of spectral frequency bands based on probability distribution of pixels in, each of the plurality of spectral frequency bands. In another embodiment of the present invention, determining a second metric of the spectral frequency band comprises determining regions with edges, rapid changes and color gradients in the digital media content. In yet another embodiment of the present invention, determining a second metric in the digital media content comprises determining regions in the digital media content with scale or rotation invariant features.

A system for performing transcoding resistant watermarking of digital media content is provided. In various embodiments of the present invention, the system comprises a high information region determining module in communication with a processor and configured to determine high information regions in the digital media content based on at least one of: a first metric and a second metric. The system further comprises a watermark insertion module in communication with the processor and configured to insert a watermark pattern in the determined high information regions of the digital media content.

In an embodiment of the present invention, the system further comprises a plurality of band pass filters configured to pass frequencies in the digital media content of a predetermined range specific to each of the plurality of band pass filters to obtain corresponding spectral frequency bands. In another embodiment of the present invention, the first metric comprises an entropy value and the high information region determining module is configured to calculate an entropy value corresponding to each of the obtained spectral frequency bands. The entropy value quantifies information in each of the spectral frequency bands.

In another embodiment of the present invention, the system further comprises a frequency band selection module in communication with the processor and configured to select a spectral frequency band with highest entropy value from amongst the calculated entropy values in the obtained spectral frequency bands.

In an embodiment of the present invention, the second metric comprises a feature metric and the high information region determining module is configured to determine regions of high feature density in the digital media content.

A system for performing transcoding resistant watermarking of digital media content is provided. In various embodiments of the present invention, the system comprises a high information region determining module in communication with a processor and configured to determine high information regions in the digital media content based on an entropy value calculated for a plurality of spectral frequency bands of the digital media content. The system further comprises a frequency band selection module in communication with the processor and configured to select a spectral frequency band with highest entropy from amongst a plurality of spectral frequency bands. Furthermore, the system comprises a watermark insertion module in communication with the processor and configured to insert a watermark pattern in the selected spectral frequency band.

In an embodiment of the present invention, the system further comprises a plurality of band pass filters configured to pass frequencies in the digital media content of a predetermined range specific to each of the plurality of band pass filters to obtain corresponding spectral frequency bands. In another embodiment of the present invention, the high information region determining module is configured to calculate the entropy value for each of the plurality of spectral frequency bands based on probability distribution of pixels in the spectral frequency bands.

A computer program product comprising a non-transitory computer-readable medium having computer-readable program code stored thereon is provided. In various embodiments of the present invention, the computer-readable program code comprises instructions that when executed by a processor, cause the processor to obtain a plurality of spectral frequency bands of the digital media content, calculate an entropy value for each of the plurality of spectral frequency bands. The entropy value quantifies information in each of the plurality of spectral frequency bands. The computer-readable program code further comprises instructions that when executed by a processor, cause the processor to select a spectral frequency band from amongst the plurality of spectral frequency bands based on the calculation. The selected spectral frequency band has the highest entropy. Furthermore, the computer-readable program code comprises instructions that when executed by a processor, cause the processor to insert a watermark in the selected spectral frequency band of the digital media content.

In an embodiment of the present invention, the computer-readable program code further comprises instructions that when executed by a processor, cause the processor to pass the digital media content through a plurality of band pass filters of specific predetermined ranges to obtain corresponding spectral frequency bands.

In another embodiment of the present invention, the computer-readable program code further comprises instructions that when executed by a processor, cause the processor to calculate the entropy value based on probability distribution of pixels in each of the spectral frequency bands.

A computer program product comprising a non-transitory computer-readable medium having computer-readable program code stored thereon is provided. In various embodiments of the present invention, the computer-readable program code comprises instructions that when executed by a processor, cause the processor to obtain a plurality of spectral frequency bands of the digital media content, calculate a first metric for each of the plurality of spectral frequency bands. The first metric quantifies information in each of the plurality of spectral frequency bands. The computer-readable program code further comprises instructions that when executed by a processor, cause the processor to determine a second metric in the digital media content. The second metric represents high feature density regions in the media content. The computer-readable program code further comprises instructions that when executed by a processor, cause the processor to identify high information regions in the digital media content using at least one of: the first metric and the second metric, and insert a watermark in the identified high information regions in the digital media content.

In an embodiment of the present invention, the computer-readable program code further comprises instructions that when executed by the processor cause the processor to calculate an entropy value corresponding to each of the plurality of spectral frequency bands based on probability distribution of pixels in each of the plurality of spectral frequency bands.

In another embodiment of the present invention, the computer-readable program code further comprises instructions that when executed by the processor cause the processor to determine regions with edges, rapid changes and color gradients in the digital media content.

In yet another embodiment of the present invention, the computer-readable program code further comprises instructions that when executed by the processor cause the processor to determine regions in the digital media content with scale or rotation invariant features.

BRIEF DESCRIPTION OF THE DRAWINGS

The present invention is described by way of embodiments illustrated in the accompanying drawings wherein.

DETAILED DESCRIPTION

Figure 1:
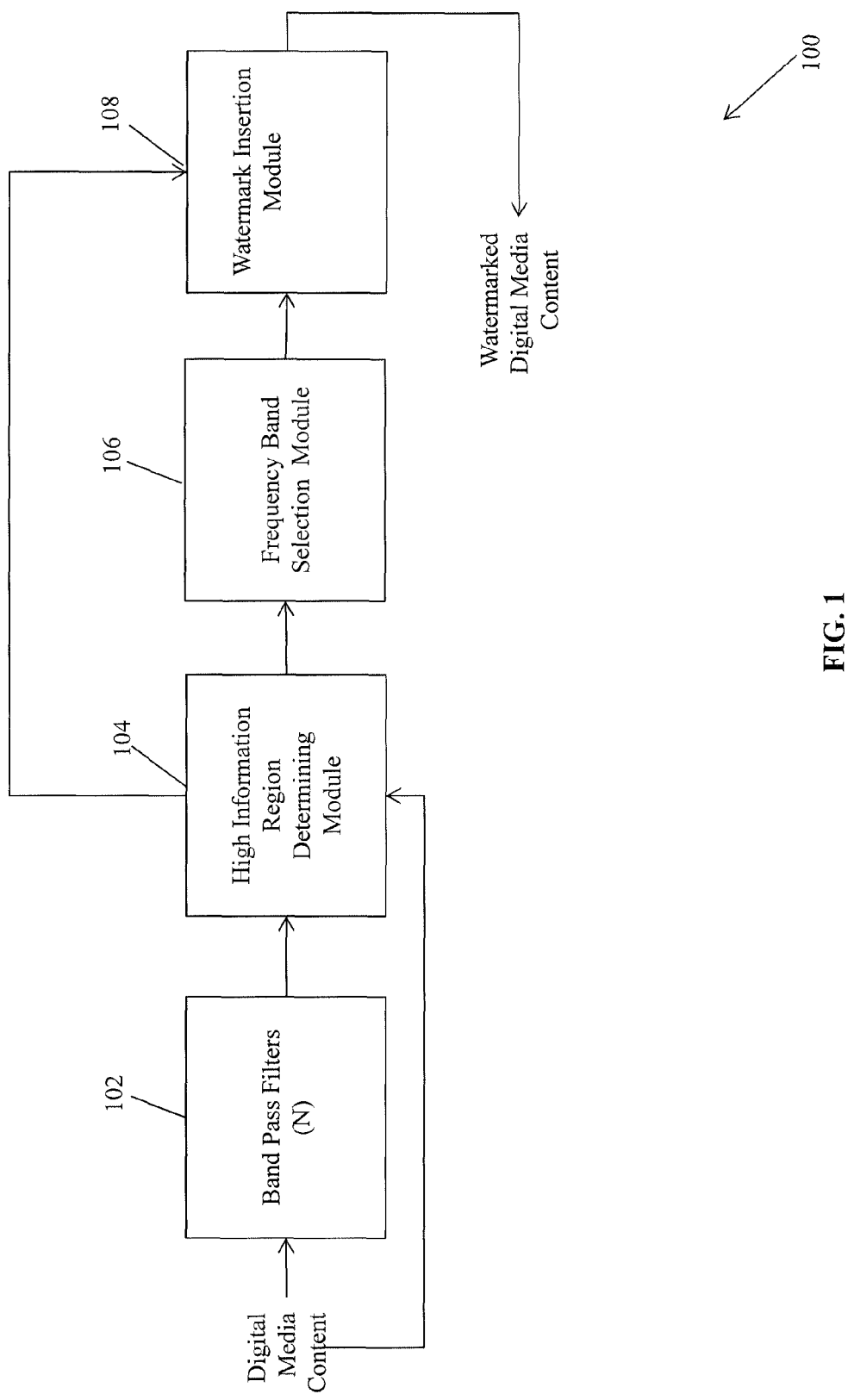
FIG. 1 is a block diagram of a system that facilitates performing transcoding resistant watermarking of a digital media content, in accordance with an embodiment of the present invention.

A system and method to perform transcoding resistant watermarking of digital media content is provided. The invention facilitates watermarking the original media content in regions which is not distorted during the transcoding process. The invention facilitates identifying regions in the media content that have high information content which is not manipulated during the transcoding process. The invention further facilitates inserting watermark in such high information regions of the original media content. In addition, the invention facilitates watermarking the original digital media content only once even though transcoding is performed each time the content is rendered on different devices. The invention further facilitates faithfully retrieving the original watermark from any format supported by different device types, after transcoding, to verify the copyright ownership of the watermark protected media content or any copyright infringement thereof.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

In an embodiment of the present invention, the digital media content is a video content which is to be provided to users on various electronic devices. In another embodiment of the present invention, the digital media content is provided by adaptive content providers to users on various electronic devices. Each electronic device supports a specific format for playback of the video content. For example, laptop supports the Audio Video Interleave (AVI) format and IPTV supports the Motion Pictures Experts Group-I (MPEG-I) format for video playback. In an exemplary embodiment of the present invention, if the original video content is in an AVI format for playback by a laptop, it needs to be transcoded to an MPEG-I format for rendering on an IPTV. It will be appreciated by a person skilled in the art that during various stages of transcoding e.g. scaling, compression, translation and interleaving frames in the video content are manipulated based on the information content of the frames. Frames of video content that include maximum information related to the video are not manipulated. For example, during the compression stage of transcoding, regions in the video content that contain low information is dropped and the regions that contain high information are preserved.

In various embodiments of the present invention, high frequency regions in the video content are identified for watermarking the video content. The watermark pattern is inserted in the identified high frequency regions such that the watermark pattern in the video content is not distorted at the time of transcoding. In an exemplary embodiment of the present invention, high frequency regions are identified in the video content which is in an AVI format. A watermark pattern is inserted in the identified high frequency regions of the AVI video content. At the time of transcoding of the AVI video to MPEG format, the high frequency regions are not manipulated and therefore the watermark pattern in the AVI video is not distorted. The effects of transcoding on the watermark pattern retrieved from the MPEG video are therefore eliminated.

FIG. 1 is a block diagram of a system 100 that facilitates performing transcoding resistant watermarking of a digital media content, in accordance with an embodiment of the present invention. The system 100 comprises a plurality of band pass filters 102, a high information region determining module 104, a frequency band selection module 106, and a watermark insertion module 108.

Band pass filter 102 is an electronic device that passes frequencies in the digital media content within two specific frequencies and generally attenuates frequencies in the digital media content that are outside the two specific frequencies. In an embodiment of the present invention, a video content is passed through a plurality of band pass filters 102. Each of the plurality of band pass filters 102 passes frequencies in the video content of a predetermined range which is specific to each of the band pass filters 102. In an exemplary embodiment of the present invention, the band pass filters 102 may be cascaded Butterworth filters with central frequencies varied from 0.5 to 25. At the output of each of the band pass filters 102, separate spectral frequency bands of the spectrum of video content are obtained. In an embodiment of the present invention, the multiple frequency bands are sent to the high information region determining module 104.

High information region determining module 104 is a software module configured to receive the multiple frequency bands and facilitates in identifying regions of high information in each of the received frequency bands.

In an embodiment of the present invention, the high information region determining module 104 uses a first metric to identify the regions of high information. The first metric used to identify the regions of high information in spatial frequency domain is the entropy metric. The entropy metric provides information related to the measure of average information content in each spectral frequency band. In an exemplary embodiment of the present invention, the entropy of each spectral band may be calculated using the following equation:

$$H = -\sum_{i=0}^{MX-1} \sum_{j=0}^{NX-1} P_{ij} \log_2(P_{ij})$$

where, H is entropy and $P_{ij}$ is Shannon Probability of a particular pixel $(i, j)$ in an M*N resolution image corresponding to each spectral band. The entropy value may be represented in units such as 'bits'. The calculated entropy value is a single point floating number which quantifies information content in each spectral frequency band based on probability function of pixels associated with each spectral frequency band.

In another embodiment of the present invention, the media content may be directly sent to the high information region determining module 104. The high information region determining module 104 uses a second metric to identify the regions of high information. The second metric used to identify the regions of high information in video content is the feature metric. The feature metric represents the high feature density regions in the media content. In an exemplary embodiment of the present invention, the high feature density regions includes regions with abundant features such as abrupt intensity transitions in video content, presence of edges in the frames of the video content which indicates non-stationary data such as actual edges of moving objects or stationary data such as edges on a texture of a background wall and gradients of colour in the video content.

In another exemplary embodiment of the present invention, one or more regions in the high information regions may include scale and rotation invariant features. Such features are resistant to transformations caused in the video content due to scaling, rotation and translation processes involved in transcoding. These features may be detected using known techniques. Examples of techniques used to detect rotational and scaling invariant features of video content in spatial domain include, but is not limited to, Scale-Invariant Feature Transform (SIFT) and Speed-Up Robust Features (SURF).

The frequency band selection module 106 is a software module configured to receive and process each of the spectral frequency bands received from the high information region determining module 104. The frequency band selection module 106 is further configured to facilitate to select a particular spectral frequency band from amongst the multiple spectral frequency bands. In an embodiment of the present invention, the frequency band selection module 106 facilitates to evaluate each of the spectral bands using the calculated entropy associated with each of the spectral bands of the video content. The evaluation is performed to identify a spectral band with highest entropy. The spectral band with the highest entropy contains highest information content and is therefore selected for inserting watermark.

Figure 2:
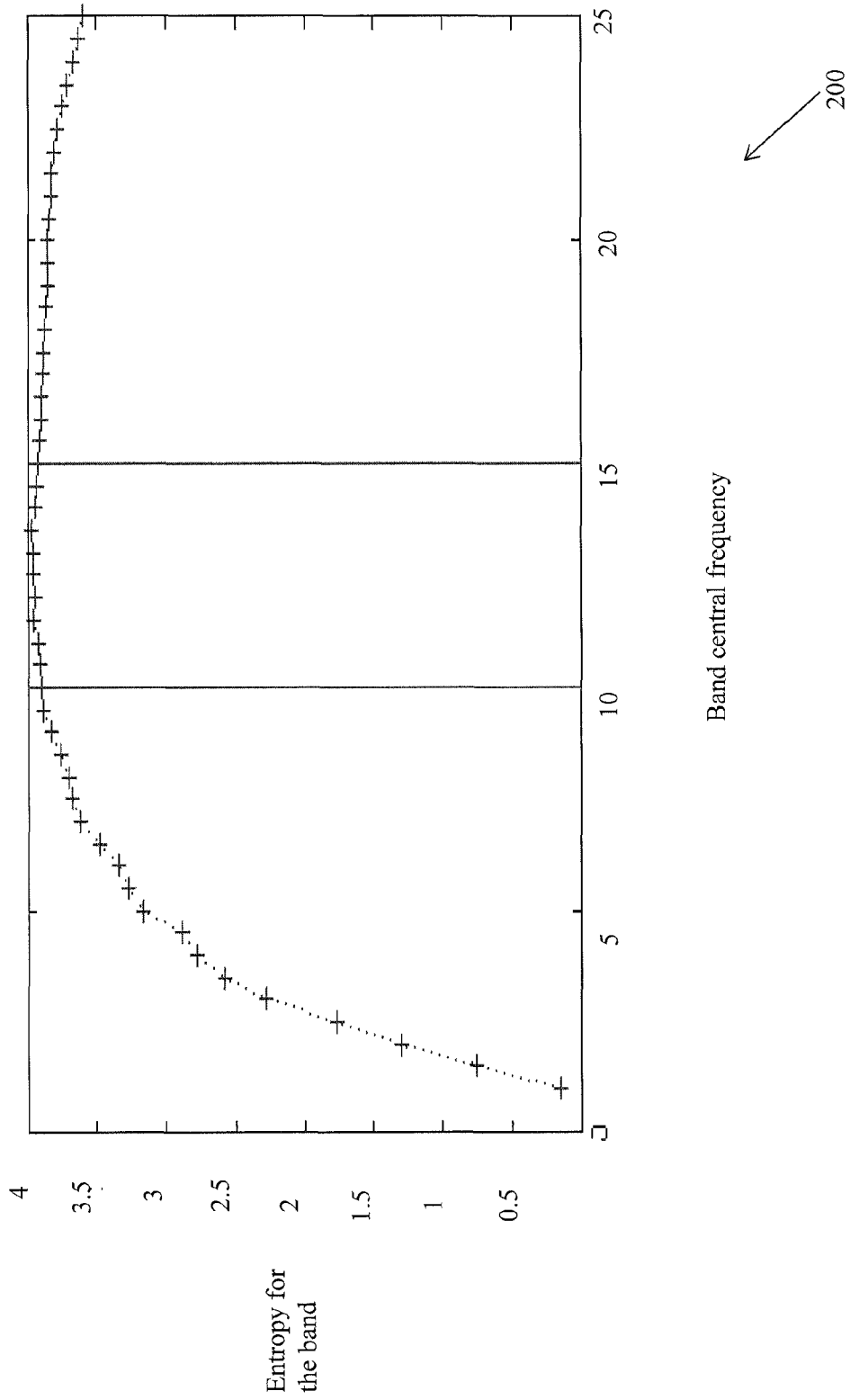
FIG. 2 is an exemplary graph illustrating an entropy plot for multiple spectral frequency bands associated with digital media content.

An exemplary graph illustrating an entropy plot for multiple spectral frequency bands associated with digital media content is shown in FIG. 2. As shown, FIG. 2 represents an entropy plot based on the calculated entropy values for each of the spectral frequency bands. The graph also represents variation of information content. As shown in FIG. 2, the maximum entropy is concentrated in the spectral frequency band 10 to 15. This in turn indicates the region of maximum information content in the video content.

The watermark insertion module 108 is a software module configured to insert watermark in regions of the video content which are identified to have high information content. In an embodiment of the present invention, the watermark insertion module 108 receives information related to the selected spectral frequency band from the frequency band selection module 106 and inserts a watermark pattern in regions of the video content that correspond to the selected spectral frequency band. In another embodiment of the present invention, the watermark insertion module 108 receives information related to the high feature regions in the video content from the high information region determining module 104 and inserts a watermark pattern in such regions. In various embodiments of the present invention, the watermark pattern is provided in high information regions over the spectrum of video content.

Figure 3:
FIG. 3 is an exemplary diagram illustrating comparison between prior art extracted watermarks and extracted watermark after transcoding when watermark is inserted in high information regions of video content, in accordance with embodiments of the present invention.
Figure 3:
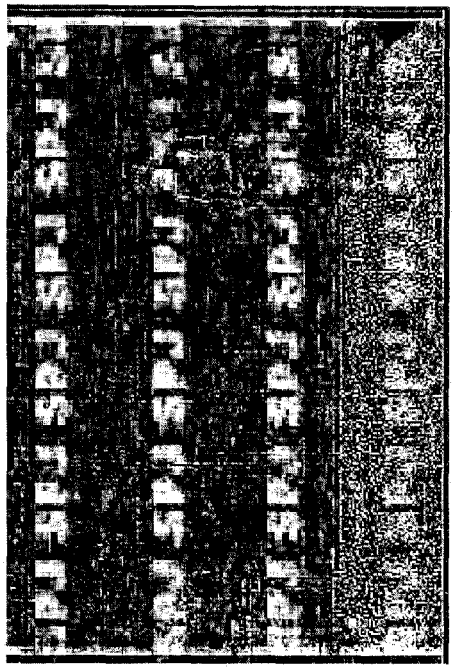
Figure 3:
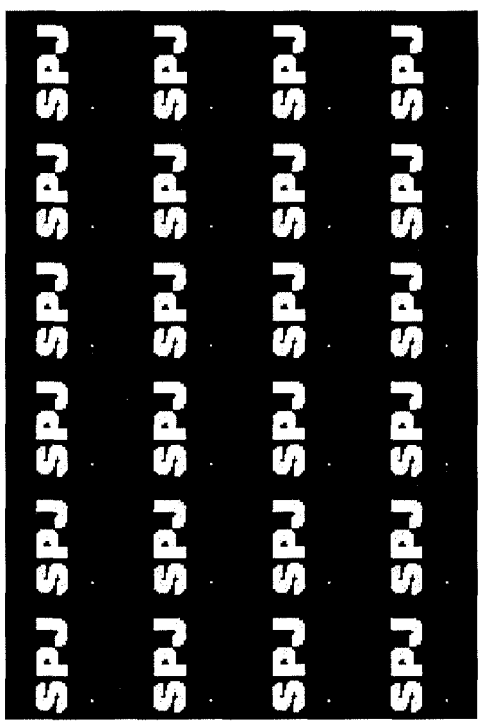
Figure 3:
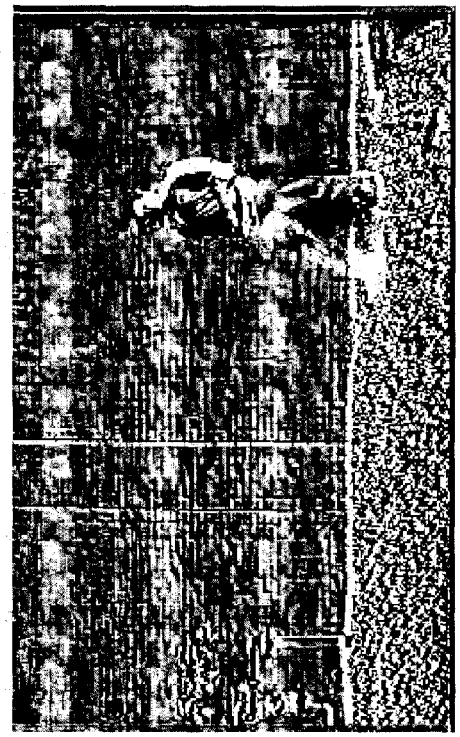

FIG. 3 is an exemplary diagram illustrating comparison between prior art extracted watermarks and extracted watermark after transcoding when watermark is inserted in high information regions of video content using the entropy metric, in accordance with embodiments of the present invention.

As shown in FIG. 3, diagram (a) represents an AVI video content in which a watermark pattern is inserted. Diagram (b) represents extracted watermark before transcoding is performed to convert the AVI video to an MPEG-1 Video format. Diagram (c) represents extracted watermark pattern after transcoding is performed to convert the AVI video to an MPEG-1. Diagram (d) represents extracted watermark pattern after transcoding is performed to convert the AVI video to an MPEG-1 where the watermark is inserted in high information regions of the video content in accordance with various embodiments of the present invention.

In an exemplary embodiment of the present invention, FIG. 3 diagram (d) provides a visual depiction of a watermark pattern which is retrieved faithfully from a transcoded MPEG-1 format when the watermark is inserted in the high information regions of the original AVI video in accordance with various embodiments of the present invention. Diagram (d) indicates that the original watermark pattern inserted in the AVI video content is not distorted during the transcoding process. The extracted watermark is close to watermark extracted before transcoding as depicted in diagram (b). Advantageously, the extracted watermark is unaltered after the transcoding process.

In another exemplary embodiment of the present invention, Root Mean Square (RMS) value of noise is calculated for watermark extracted after transcoding (as represented in diagram (c)) and watermark extracted after transcoding when the watermark is inserted in high information regions of the video content (as represented in diagram (d)). The RMS value of noise may be calculated using the following equation:

$$\text{RMS energy} = 10 \log \sqrt{\frac{1}{M*N} \left( \sum_{i=1}^{i=M} \sum_{j=1}^{j=N} I(i,j)^2 \right)} \, dB$$

The RMS value of noise for the extracted watermark as per diagram (c) is calculated as 13.05 db and RMS value of noise for the extracted watermark as per diagram (d) i.e. is found to be 4.246 dB. This further indicates that the effects of transcoding on watermarked video content is reduced when the watermark is inserted in high information regions of the video content in accordance with embodiments of the present inventions.

Figure 4:
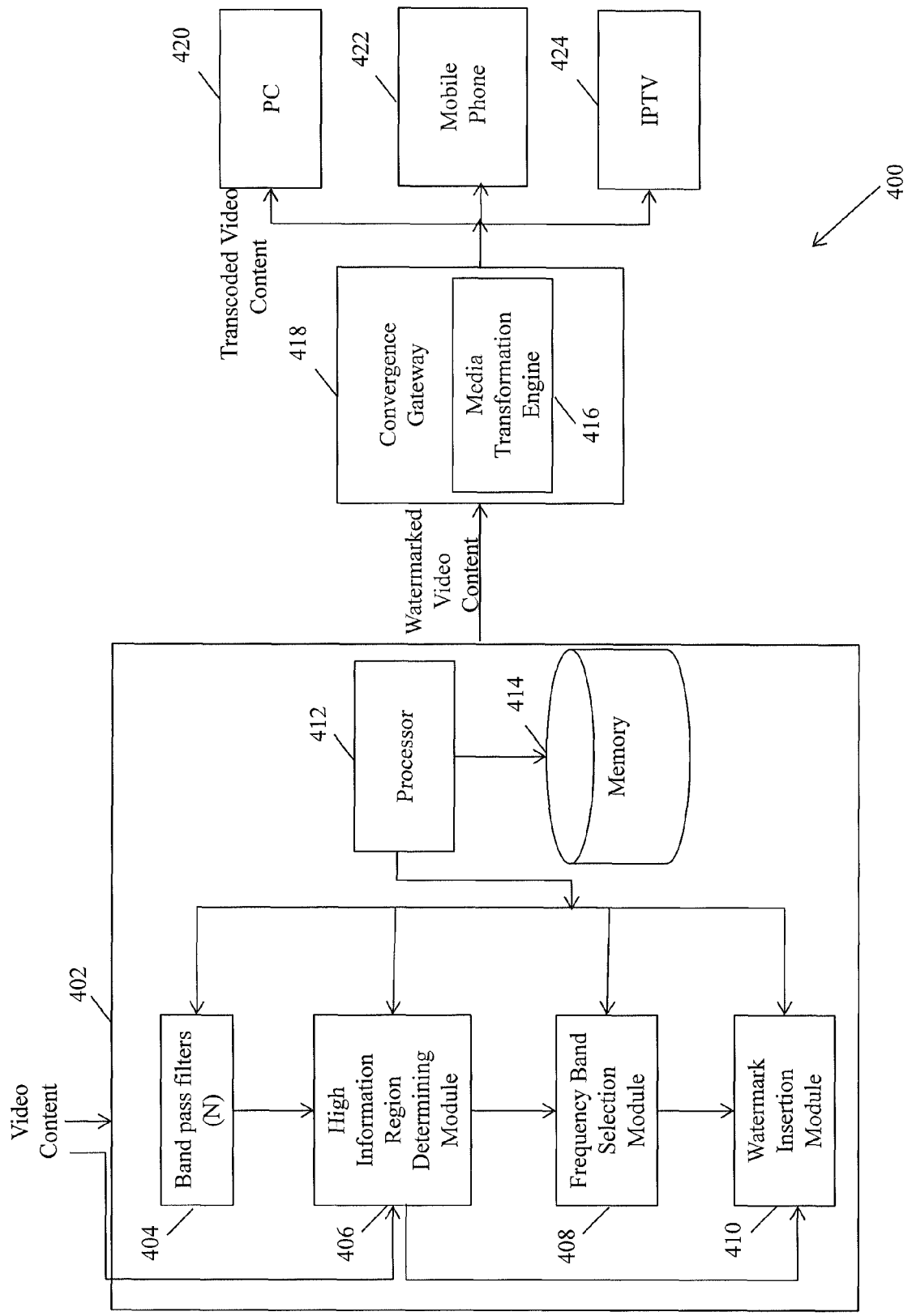
FIG. 4 illustrates an exemplary high level block diagram of a system that facilitates performing transcoding resistant watermarking of a digital media content, in accordance with various embodiments of the present invention.

FIG. 4 illustrates an exemplary high level block diagram of a system that facilitates performing transcoding resistant watermarking of a digital media content, in accordance with various embodiments of the present invention.

As shown in FIG. 4, band pass filters 404, high information region determining module 406, frequency band selection module 408, and watermark insertion module 410 within the exemplary system 402 operate in communication with a processor 412 and a memory 414.

In various embodiments of the present invention, the band pass filters 404, high information region determining module 406, frequency band selection module 408, and watermark insertion module 410 communicates with the processor 412 which executes a set of program instructions to insert a watermark pattern in high frequency regions of the video content in accordance with various embodiments of the present invention. The memory 414 stores one or more software programs and data which are retrieved by the various modules of the exemplary system 402 for executing the functionalities of the present invention.

In an embodiment of the present invention, the watermarked video content may be transcoded by a media transformation engine 416 in a convergence gateway 418 into different formats specific to different devices of the user such as PC 420, mobile phone 422 and IPTV 424. The transcoded video content of a particular format is then securely delivered to corresponding device i.e. the PC 420, mobile phone 422 and IPTV 424 of the user.

Figure 5:
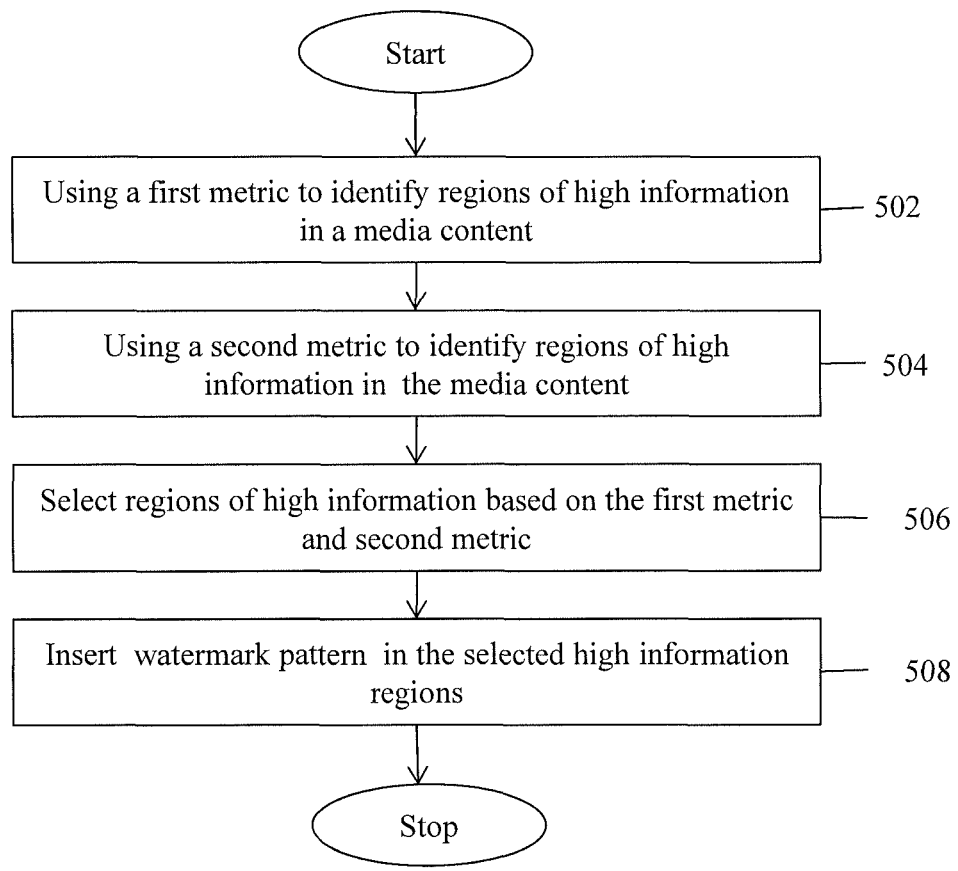
FIG. 5 illustrates a flowchart of a method that facilitates performing transcoding resistant watermarking of digital media content, in accordance with an embodiment of the present invention.

FIG. 5 illustrates a flowchart of a method that facilitates performing transcoding resistant watermarking of digital media content, in accordance with an embodiment of the present invention At step 502, a first metric is used to identify regions of high information in a media content. In an embodiment of the present invention, video content is passed through a plurality of band pass filters. Each of the plurality of band pass filters passes frequencies in the video content of a predetermined range which is specific to each of the band pass filters. At the output of each of the band pass filters separate spectral frequency bands of the spectrum of video content are obtained. In an embodiment of the present invention, entropy value is calculated for each spectral frequency band based on probability distribution of pixels in each spectral band. The calculated entropy value quantifies information content in each spectral frequency band based on probability function of pixels associated with each spectral frequency band. In an embodiment of the present invention, the selected spectral frequency band corresponds to the frequency band in the video content which has the highest entropy. The highest entropy indicates high information regions in the media content.

At step 504, a second metric is used to identify regions of high information in the media content. In an embodiment of the present invention, the second metric used to identify the regions of high information in video content is the feature metric. The feature metric represents the high feature density regions in the media content. In an exemplary embodiment of the present invention, the high feature density regions includes regions with abundant features such as abrupt intensity transitions in video content, edges in video content and gradients of colour in the video content. In another exemplary embodiment of the present invention, the high feature density regions may include scale invariant and rotation invariant features. The features with such characteristics are resistant to transformations caused in the video content due to scaling, rotation and translation processes involved in transcoding. The features with such characteristics may be detected using known techniques.

At step 506, regions of high information are selected in the media content based on the first metric and the second metric. In an embodiment of the present invention, regions in the video content that correspond to high entropy are identified as regions that contain high information content. In another embodiment of the present invention, regions in the video content that correspond to high feature density are identified as containing high information content.

At step 508, watermark is inserted in the regions of high information. In an embodiment of the present invention, a watermark pattern is inserted along the spectrum of the video content in regions that correspond to high information content.

Figure 6:
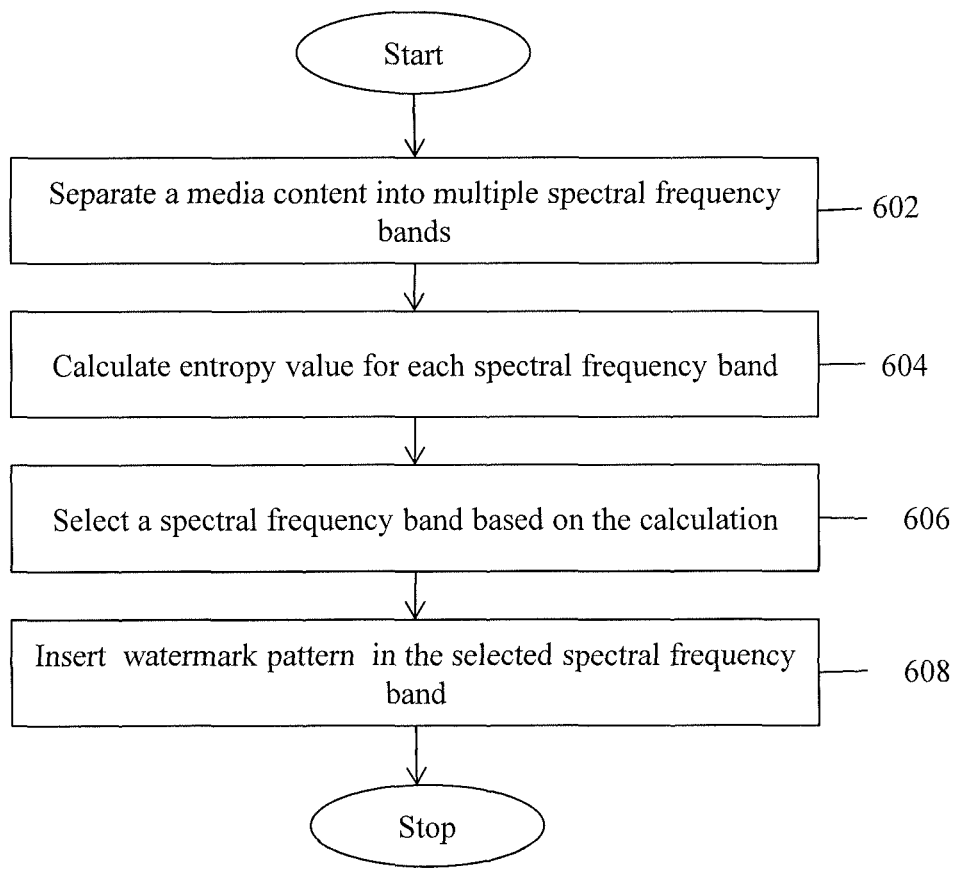
FIG. 6 illustrates a flowchart of a method that facilitates performing entropy based transcoding resistant watermarking of digital media content, in accordance with an embodiment of the present invention.

FIG. 6 illustrates a flowchart of a method that facilitates performing entropy based transcoding resistant watermarking of digital media content, in accordance with an embodiment of the present invention.

At step 602, a media content is separated into multiple spectral frequency bands. In an embodiment of the present invention, video content is passed through a plurality of band pass filters. Each of the plurality of band pass filters passes frequencies in the video content of a predetermined range which is specific to each of the band pass filters. At the output of each of the band pass filters separate spectral frequency bands of the spectrum of video content are obtained.

At step 604, entropy value is calculated for each spectral frequency band. In an embodiment of the present invention, entropy value is calculated for each spectral frequency band based on probability distribution of pixels in each spectral band. The calculated entropy value quantifies information content in each spectral frequency band based on probability function of pixels associated with each spectral frequency band.

At step 606, a spectral frequency band is selected amongst the multiple spectral frequency bands based on the calculation. In an embodiment of the present invention, the selected spectral frequency band corresponds to the frequency band in the video content which has the highest entropy. The highest entropy indicates high information regions in the media content.

At step 608, watermark is inserted in regions of the media content which corresponds to the selected spectral frequency band. In an embodiment of the present invention, a watermark pattern is inserted in regions of the video content which corresponds to the selected spectral frequency band.

The present invention may be implemented in numerous ways including as a, method, or a computer program product such as a computer readable storage medium or a computer network wherein programming instructions are communicated from a remote location.

Various embodiments of the present invention, may be implemented via one or more computer systems. The computer system includes at least one processing unit and memory. The processing unit executes program instructions and may be a real or a virtual processor. The computer system is not intended to suggest any limitation as to scope of use or functionality of described embodiments. Typical examples of a computer system include a general-purpose computer, a programmed microprocessor, a micro-controller, a peripheral integrated circuit element, and other devices or arrangements of devices that are capable of implementing the steps that constitute the method of the present invention. In an embodiment of the present invention, the memory may store software for implementing various embodiments of the present invention.

The present invention may suitably be embodied as a computer program product for use with a computer system. The method described herein is typically implemented as a computer program product, comprising a set of program instructions which is executed by a computer system or similar device. The set of program instructions may be a series of computer readable codes stored on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for performing transcoding resistant watermarking of digital media content for rendering the digital media content on different electronic devices, the method comprising:
    obtaining a plurality of spectral frequency bands of the digital media content by passing the digital media content through a plurality of band pass filters of specific predetermined ranges, wherein each of the plurality of spectral frequency bands correspond to the specific predetermined range of the corresponding band pass filter;
    calculating an entropy value, for each of the plurality of spectral frequency bands, over the entire digital media content in each of the obtained plurality of spectral frequency bands, wherein the entropy value quantifies information in each of the plurality of spectral frequency bands;
    selecting a spectral frequency band from amongst the plurality of spectral frequency bands based on the calculation, wherein the selected spectral frequency band has the highest entropy; and
    inserting a watermark in the selected spectral frequency band of the digital media content, wherein the insertion is performed one time and the digital media content with the inserted watermark is transcoded each time the watermarked digital media content is rendered on a different electronic device.

2. The method of claim 1, wherein calculating the entropy value corresponding to each of the plurality of spectral frequency bands comprises calculating the entropy value based on probability distribution of pixels in each of the spectral frequency bands.

3. A system for performing transcoding resistant watermarking of digital media content for rendering the digital media content on different electronic devices, the system comprising:
    a high information region determining module in communication with a processor and configured to determine high information regions in the digital media content based on an entropy value calculated for a plurality of spectral frequency bands over the entire digital media content in each of the plurality of spectral frequency bands, wherein the entropy value quantifies information in each of the spectral frequency bands;
    a frequency band selection module in communication with the processor and configured to select a spectral frequency band with highest entropy from amongst the plurality of spectral frequency bands; and
    a watermark insertion module in communication with the processor and configured to insert a watermark pattern in the selected spectral frequency band, wherein the insertion is performed one time and the digital media content with the inserted watermark is transcoded each time the watermarked digital media content is rendered on a different electronic device.

4. The system of claim 3 further comprising a plurality of band pass filters configured to pass frequencies of the digital media content of a predetermined range specific to each of the plurality of band pass filters to obtain corresponding spectral frequency bands.

5. The system of claim 3, wherein the high information region determining module is configured to calculate the entropy value for each of the plurality of spectral frequency bands based on probability distribution of pixels in the spectral frequency bands.

6. A computer program product comprising:
    a non-transitory computer-readable medium having computer-readable program code stored thereon, the computer-readable program code comprising instructions that when executed by a processor, cause the processor to:
        obtain a plurality of spectral frequency bands of the digital media content by passing the digital media content through a plurality of band pass filters of specific predetermined ranges, wherein each of the plurality of spectral frequency bands correspond to the specific predetermined range of the corresponding band pass filter;
        calculate an entropy value, for each of the plurality of spectral frequency bands, over the entire digital media content in each of the obtained plurality of spectral frequency bands, wherein the entropy value quantifies information in each of the plurality of spectral frequency bands;
        select a spectral frequency band from amongst the plurality of spectral frequency bands based on the calculation, wherein the selected spectral frequency band has the highest entropy; and
        insert a watermark in the selected spectral frequency band of the digital media content, wherein the insertion is performed one time and the digital media content with the inserted watermark is transcoded each time the watermarked digital media content is rendered on a different electronic device.

7. The computer program product of claim 6, wherein the computer-readable program code further comprises instructions that when executed by a processor, cause the processor to calculate the entropy value based on probability distribution of pixels in each of the spectral frequency bands.

* * * * *